United States Patent [19]

Cooper et al.

[11] E Patent Number: Re. 31,780

[45] Reissued Date of Patent: Dec. 25, 1984

[54] MULTILAYER LIGHT-REFLECTING FILM

[75] Inventors: Scott A. Cooper, Yorktown Heights; Ramakrishna Shetty, White Plains, both of N.Y.; Jules Pinsky, Bloomfield, Conn.

[73] Assignee: The Mearl Corporation, Ossining, N.Y.

[21] Appl. No.: 521,127

[22] Filed: Aug. 8, 1983

Related U.S. Patent Documents

Reissue of:

[64] Patent No.: 4,310,584
Issued: Jan. 12, 1982
Appl. No.: 107,351
Filed: Dec. 26, 1979

[51] Int. Cl.[3] ..... B32B 7/02; B32B 27/06; B32B 27/36

[52] U.S. Cl. ..... 428/212; 264/171; 264/173; 350/166; 428/213; 428/480; 428/483

[58] Field of Search ..... 428/212, 213, 392, 480, 428/483; 264/171, 173; 350/166

[56] References Cited

U.S. PATENT DOCUMENTS

| | | | |
|---|---|---|---|
| 3,479,425 | 11/1969 | Lefevre et al. | 264/171 |
| 3,511,903 | 5/1970 | Glass et al. | 264/173 X |
| 3,565,985 | 2/1971 | Schrenk et al. | 264/171 |
| 3,759,647 | 9/1973 | Schrenk et al. | 264/171 X |
| 3,773,882 | 11/1973 | Schrenk | 264/171 |
| 3,801,429 | 4/1974 | Schrenk et al. | 428/392 |
| 4,218,510 | 8/1980 | Willson | 428/483 X |

FOREIGN PATENT DOCUMENTS

| | | | |
|---|---|---|---|
| 1141981 | 2/1969 | United Kingdom | 428/212 |

*Primary Examiner*—Thomas J. Herbert
*Attorney, Agent, or Firm*—Ostrolenk, Faber, Gerb & Soffen

[57] ABSTRACT

Improvements in multilayer light-reflecting film are effected by the use of thermoplastic polyester as the high refractive index component of a system in which two or more resinous materials form a plurality of layers.

11 Claims, No Drawings

MULTILAYER LIGHT-REFLECTING FILM

Matter enclosed in heavy brackets [ ] appears in the original patent but forms no part of this reissue specification; matter printed in italics indicates the additions made by reissue.

BACKGROUND OF THE INVENTION

The present invention relates to multilayer coextruded light-reflecting films which have a narrow reflection band because of light interference. When the reflection band occurs within the range of visible wavelength, the film is iridescent. Similarly, when the reflection band falls outside the range of visible wavelength, the film is either ultraviolet or infrared reflecting.

The multilayer films and methods by which they can be produced are known in the art. In this connection, the reader's attention is directed to the following U.S. patents which are hereby incorporated by reference: U.S. Pat. Nos. 3,328,003; 3,442,755; 3,448,183; 3,479,425; 3,480,502; 3,487,505; 3,511,903; 3,549,405; 3,555,128; 3,565,985; 3,576,707; 3,642,612; 3,711,176; 3,759,647; 3,773,882; and 3,801,429.

The multilayer films are composed of a plurality of generally parallel layers of transparent thermoplastic resinous material in which the contiguous adjacent layers are of diverse resinous material whose index of refraction differs by at least about 0.03. The film contains at least 10 layers and more usually at least 35 layers and, preferably, at least about 70 layers.

The individual layers of the film are very thin, usually in the range of about 30 to 500 nm, preferably about 50–400 nm, which causes constructive interference in light waves reflected from the many interfaces. Depending on the layer thickness and the refractive index of the polymers, one dominant wavelength band is reflected and the remaining light is transmitted through the film. The reflected wavelength is proportional to the sum of the optical thicknesses of a pair of layers. The reflected wavelength can be calculated by the formula $$\lambda_M = \frac{2}{M}(n_1t_1 + n_2t_2)$$

In this formula, $\lambda$ is the reflected wavelength, M is the order of reflection, t is the layer thickness, n is the refractive index, and 1 and 2 indicate the polymer of the first layer and the polymer of the second layer, respectively. The quantity nt is the optical thickness of a layer. For first order reflection, i.e. when M is 1, visible light is reflected when the sum of optical thicknesses falls between about 200 and 350 nm. When the sum is lower than about 200, the reflection is in the ultraviolet region of spectrum and when the sum is greater than about 350 nm, the reflection is in the infrared region.

The quantity of the reflected light (reflectance) and the color intensity depend on the difference between the two refractive indexes, on the ratio of optical thicknesses of the layers, on the number of layers and on the uniformity of the thicknesses. If the refractive indexes are the same, there is no reflection at all from the interfaces between the layers. In the multilayer films, the refractive indexes of contiguous adjacent layers differ by at least 0.03 and preferably by at least 0.06 or more. For first order reflections, reflectance is highest when the optical thicknesses of the layers are equal although suitably high reflectances can be achieved when the ratio of the two optical thicknesses falls between 5:95 and 95:5. Distinctly colored reflections are obtained with as few as 10 layers; however, for maximum color intensity it is desired to have between 35 and 1000 or even more layers. High color intensity is associated with a reflection band which is reltively narrow and which has high reflectance at its peak. It should be recognized that although the term "color intensity" has been used here for convenience, the same considerations apply to the invisible reflection in the ultraviolet and infrared ranges.

The multilayer films can be made by a chill roll casting technique using a conventional single manifold flat film die in combination with a feedblock which collects the melts from each of two or more extruders and arranges them into the desired layer pattern. Feedblocks are described in the aforementioned U.S. Pat. Nos. 3,565,985 and 3,773,882. The feedblocks can be used to form alternating layers of either two components (i.e. ABAB . . . ); three components (e.g. ABCABCA . . . or ACBCACBC . . . ); or more. The very narrow multilayer stream flows through a single manifold flat film die where the layers are simultaneously spread to the width of the die and thinned to the final die exit thickness. The number of layers and their thickness distribution can be changed in inserting a different feedport module. Usually, the outermost layer or layers on each side of the sheet are thicker than the other layers. This thicker skin may consist of one of the components which makes up the optical core; may be a different polymer which is utilized to impart desirable mechanical, heat sealing, or other properties; or may be a combination of these.

The high refractive index component used heretofore in commercial production has been polystyrene (refractive index 1.60). Other high index resins which are optically suitable but which have disadvantages in terms of cost or difficulty of extrusion in the multilayer process are polycarbonate (1.59), vinylidene chloride (85%)-vinyl chloride (15%) copolymer (1.61), and polydichlorostyrene (1.62). Polystyrene in combination with such lower refractive index polymers as poly(methyl methacrylate), polypropylene, and ethylene vinyl acetate, all of which are close to 1.50 in refractive index, produces iridescent films of desirable optical properties which, however, reveal deficiencies in certain mechanical properties. For example, the adhesion between individual layers of the multilayer structure may be insufficient, and the film may suffer from internal delamination or separation of layers during use. The iridescent film is often adhered to paper or board for its decorative effect, and is then used for greeting cards, cartons, and the like. Delamination of the film is unsightly and may even lead to separation of the glued joints of carton. In addition, the solvent resistance and heat stability of such films are not as great as desired for widespread utilization.

Accordingly, it is the object of this invention to provide new and improved multilayer light-reflecting films which exhibit increased resistance to delamination, improved solvent resistance and/or improved heat stability. This and other objects of the invention will become apparent to those skilled in this art from the following detailed description.

SUMMARY OF THE INVENTION

This invention relates to an improved multilayer light-reflecting film and more particularly to a transparent thermoplastic resinous film of at least 10 generally parallel layers in which the contiguous adjacent layers are of diverse transparent thermoplastic resinous material differing in refractive index by at least about 0.03 and at least one of the resinous materials being a thermoplastic polyester or copolyester resin.

DESCRIPTION OF THE PREFERRED EMBODIMENTS

It has now been found that the objectives of this invention are realized by employing as the high refractive index component a transparent thermoplastic polyester or copolyester resin which is characterized by a refractive index of about 1.55 to about 1.61. Examples of usable thermoplastic polyester resins include poly(ethylene terephthalate) (PET) which is made by reacting either terephthalic acid or dimethyl terephthalate with ethylene glycol; polybutylene terephthalate (PBT) which is made by the catalyzed condensation of 1,4-butanediol with either terephthalic acid or dimethyl terephthalate; and the various thermoplastic copolyesters which are synthesized using more than one glycol and/or more than one dibasic acid. PETG copolyester, for example, is a glycol modified PET made from ethylene glycol and cyclohexanedimethanol (CHDM) and terephthalic acid; PCTA copolyester is an acid modified copolyester of CHDM with terephthalic and isophthalic acids. Iridescent films of high color intensity and greatly improved properties are obtained by using the thermoplastic polyester resins as the high refractive index resins in conjunction with thermoplastic resins of a lower refractive index. A list of typical resins falling in the latter category is given in Table 1 and it will be appreciated that in making suitable combinations, a refractive index difference of at least about 0.03, preferably at least about 0.06, is maintained.

TABLE 1

| Polymer name: | Approximate Refractive Index |
|---|---|
| FEP (fluorinated ethylene-propylene copolymer | 1.34 |
| Polytetrafluoroethylene | 1.35 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 1.48 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butyral | 1.49 |
| Polypropylene | 1.49 |
| Ethylene vinyl acetate | 1.50 |
| Low density polyethylene (branched) | 1.51 |
| Polyisobutylene | 1.51 |
| Ionomer | 1.51 |
| Natural rubber | 1.52 |
| Perbunan | 1.52 |
| Polybutadiene | 1.52 |
| Nylon (condensation copolymer of hexamethylene-diamine and adipic acid | 1.53 |

TABLE 1-continued

| Polymer name: | Approximate Refractive Index |
|---|---|
| Polyvinyl chloroacetate | 1.54 |
| Polyethylene (high density linear) | 1.54 |
| Polyvinylchloride | 1.54 |
| A copolymer of 85 parts by weight methyl methacrylate and 33 parts by weight styrene | 1.54 |

A preferred combination in accordance with this invention involves the use of polybutylene terephthalate (PBT) as the thermoplastic polyester and poly(methyl methacrylate) (PMMA) as the low refractive index material. To prepare the film, the polyester was fed to the feedblock from one extruder and the PMMA was fed from a second extruder to form a 0.8 mil (20 μm) thick film consisting of 115 optical layers and two polyester skin layers. Each skin layer was about 10% of the thickness of the total film. The polyester optical layers were each about 0.2 μm in optical thickness, the PMMA optical layers each about 0.1 μm. A 112-centimeter die was used to produce a 90-centimeter wide film of uniform overall thickness. The film was brightly iridescent, and was prevailing green and red when seen by reflection at perpendicular incidence.

To evaluate this polyester/PMMA film for resistance to delamination, one surface of the film was restrained either by backing with adhesive coated tape or by adhesive lamination to rigid paperboard. Pressure sensitive tape was applied to the other surface of the film. The film withstood many pulls on the tape without any sign of delamination, even when the tape was applied at the edge of the film. The test was made still more severe by wiping the exposed side with a solvent, such as toluene, which promotes delamination in other types of iridescent film, e.g. polystyrene (PS)/propylene-ethylene copolymer (PP) and PS/ethylene vinyl acetate (EVA). The polyester/PMMA film withstood the tape test without any sign of delamination.

Other prior art films similarly failed in these delamination tests. For example, the brightly iridescent film consisting of PS/PMMA was so brittle that it fractured under the conditions of the test. Iridescent films consisting of PS/PP and PS/EVA delaminated readily under the same test conditions.

A number of other properties are also superior to those of previously known films. These include excellent mar resistance, temperature resistance, and solvent resistance. The latter is most important for film which is brought in contact with adhesives, printing inks, or lacquers containing organic solvents.

To test the solvent resistance of the film, each of a number of solvents was applied to the surface of individual samples by means of a soaked cotton swab. The solvent was permitted to air dry. The PBT/PMMA iridescent film underwent no change on treatment with aliphatic or aromatic hydrocarbons or their mixtures, alcohols, aliphatic esters such as ethyl acetate and butyl acetate, or ketones such as acetone and methyl isobutyl ketone. The previously known commercial films of PS/PMMA, PS/PP, and PS/EVA, evaluated by the same technique, suffered crazing, loss of gloss, change of color, or loss of color when exposed to several of these solvents, including heptane, toluene, and various commercial mixed hydrocarbon solvents, as well as butyl acetate and methyl isobutyl ketone.

Temperature stability of the polyester film was similarly superior to that of previously known films. Samples were placed in air-circulating ovens for 30 minutes at various temperatures. The temperature of first change was noted, with the following results: Polyester film PBT/PMMA, 220° C.; prior art films PS/PMMA, 150° C.; PS/PP, 130° C.; PS/EVA, 120° C. Improved temperature stability is very important for applications in which the films is to be laminated or adhered to another surface by a technique which requires elevated temperature.

It was mentioned previously that the skin layer is thicker than the optical layers. Each skin layer should have a thickness of at least about 5% of the total thickness of the film, and may be as great as about 40% of the total film thickness. A variant of the film utilizes a third extruder to provide on each surface an outer skin of thermoplastic impact-modified acrylic resin. This skin layer may supplant the usual skin layer which consists of one of the optical components, or may be added on top of it. Each impact acrylic layer should be in thickness at least about 5% of the total thickness of the film; the sum of each impact acrylic layer and the adjacent optical resin skin layer, if any, may be as great as about 40% of the total film thickness or even greater.

Impact acrylic imparts improved winding characteristics and resistance to blocking, and provides a surface which is very receptive to adhesives, printing inks, and hot stamping foils. Such film in addition has improved resistance to ultraviolet light.

The impact-modified acrylic resin may be a copolymer, e.g. methyl methacrylate polymerized with another monomer such as methyl acrylate, ethyl acrylate, butyl acrylate, acrylonitrile, styrene, or butadiene; a terpolymer or multi-polymer made from three or more of such monomers; or a blend of methyl methacrylate with elastomer, vinyl, or other modifiers. Commercial impact acrylics are available as Lucite T-1000 (DuPont) and Plexiglas DR (Rohm & Haas).

The two-component iridescent films display excellent resistance to delamination, and good iridescent color regardless of which component serves as the skin. Other properties may be enhanced when one or the other component is the skin layer. With polyester/PMMA, for example, the film is more flexible with polyester as the skin layer, and more brittle with PMMA as the skin layer. Thus, polyester is preferred for the skin where flexibility is desirable, as in decorative wrappings; PMMA is preferred where the film is to be cut into small pieces such as flakes or "glitters". The choice depends on the particular pair of components in the optical core and the applications for which the film is intended.

The use of a third resin as the skin layer substantially decreases the importance of the internal sequence, since the properties are modified by the specific skin resin. Impact acrylic as a skin may be adjacent to either polyester or PMMA in the above example. In other combinations, it may be desirable to choose a particular sequence in order to assure maximum adhesion between the skin layer and the multilayer optical core.

In order to further illustrate the present invention, various examples are set forth below and it will be appreciated that these examples are not intended to limit the invention. Unless otherwise stated, all temperatures are in degrees Centigrade and all parts and percentages are by weight throughout the specification and claims.

EXAMPLE 1

Alternating Layers of Polyester and Poly(methyl methacrylate) (PMMA)

Polybutylene terephthalate thermoplastic polyester was fed to the feedblock from one extruder and PMMA from a second extruder to form a 0.75 mil (19 μm) thick film consisting of 115 optical layers and 2 polyester skin layers. Each skin layer was about 20% of the thickness of the total film. The polyester optical layers were each about 0.15 μm in optical thickness, the PMMA layers about 0.07 μm. The film was brightly iridescent, and was prevailingly blue and green when seen by reflection at perpendicular incidence. The film displayed excellent resistance to delamination as well as superior solvent resistance and temperature stability.

EXAMPLE 2

Polyester/PMMA multilayer structure with additional skin layers containing impact modified acrylic copolymer A multilayer structure similar to that of Example 1 was prepared, except that a second skin layer was added to each surface by means of a third extruder. This outer skin layer consisted of a mixture of equal parts of two resins, (1) PMMA and (2) an impact-modified acrylic resin, namely, Lucite T-1000 (DuPont) a polymethyl methacrylate modified with elastomer. This film was superior to that of Example 1 in that its winding and antiblocking properties were superior, and it was more suitable for printing and hot stamping.

EXAMPLES 3–15

Various thermoplastic polyester polymers and copolymers were utilized in conjunction with a number of polymers of lower refractive index, sometimes in two-component structures, sometimes in structures utilizing additional components for skin layers, as shown in the following tabulation. All examples yielded intensely iridescent films with improved heat stability and, [expecially] *especially* where PMMA was the low index polymer, improved resistance to delamination.

| Example | High Index Polymer | Low Index Polymer | Skin Layer Polymer(s) |
|---|---|---|---|
| 3 | PBT | EVA | PBT |
| 4 | PBT | EVA | PMMA and impact modified polymethyl methacrylate |
| 5 | PBT | PP | PBT |
| 6 | PBT | PP | PP |
| 7 | PBT | PP | PMMA and impact modified polymethyl methacrylate |
| 8 | PBT | Ionomer | PBT |
| 9 | PBT | Ionomer | Impact modified copolymer of methyl methacrylate and butyl acrylate |
| 10 | PETG | PMMA | PETG |
| 11 | PETG | PMMA | PMMA and impact modified polymethyl methacrylate |
| 12 | PET | PMMA | PET |
| 13 | PET | PMMA | Modified acrylic terpolymer of methyl methacrylate, butadiene, and acrylonitrile |
| 14 | PCTA | PMMA | PCTA |
| 15 | PCTA | PMMA | PMMA and impact modified polymethyl methacrylate |

Various changes and modifications can be made in the present invention without departing from the spirit and scope thereof. For example, while the invention has been described with reference to cast film, flat film type of film production, iridescent films can also be made by the tubular process (blown film). Accordingly, the various embodiments disclosed herein were for the purpose of illustration only and where not intended to limit the invention.

What is claimed is:

1. A transparent thermoplastic resinous laminate film of at least 10 very thin layers of substantially uniform thickness, said layers being generally parallel, the contiguous adjacent layers being of different transparent thermoplastic resinous materials one of which is a *terephthalate* thermoplastic polyester or copolyester resin having a refractive index of 1.55–1.61 and the adjacent resinous material having a refractive index which is lower by at least about 0.03, the contiguous adjacent layers differing in refractive index by at least about 0.03.

2. The transparent thermoplastic resinous laminate film of claim 1, wherein said polyester or copolyester is selected from the group consisting of poly(ethylene terephthalate), and a copolyester of cyclohexanedimethanol and an acid comprising terephthalate acid.

3. The transparent thermoplastic resinous laminate film of claim 1 having at least 35 layers.

4. The transparent thermoplastic resinous laminate film of claim 3 having at least about 70 layers.

5. The transparent thermoplastic resinous laminate film of claim 4 wherein said adjacent resinous material has a refractive index which is lower by at least about 0.06.

6. The transparent thermoplastic resinous laminate film of claim 1, wherein said polyester is polybutylene terephthalate.

7. The transparent thermoplastic resinous laminate film of claim 6, wherein said other resinous material is polymethyl methacrylate.

8. The transparent thermoplastic resinous laminate film of claim 1 wherein the outermost layers of said film comprise an impact modified acrylic resin and the thickness of each of the outermost layers is at least 5% of the total thickness of the film.

9. The transparent thermoplastic resinous laminate film of claim 8 wherein said impact modified acrylic resin is a terpolymer of methyl methacrylate, butadiene and acrylonitrile, or methyl methacrylate combined with an elastomer.

10. The transparent thermoplastic resinous laminate film of claim 9 wherein said polyester or copolyester resin is polybutylene terephthlate and adjacent other resin is polymethyl methacrylate.

11. The transparent thermoplastic resinous laminate film of claim 10 of at least 70 substantially uniformly thick layers.

* * * * *